US008931157B2

(12) United States Patent
Hughes

(10) Patent No.: US 8,931,157 B2
(45) Date of Patent: Jan. 13, 2015

(54) FABRIC DISPLAY PANELS AND METHODS OF MAKING SAME

(71) Applicant: Robert P. Hughes, Chevy Chase, MD (US)

(72) Inventor: Robert P. Hughes, Chevy Chase, MD (US)

( * ) Notice: Subject to any disclaimer, the term of this patent is extended or adjusted under 35 U.S.C. 154(b) by 0 days.

(21) Appl. No.: 13/887,242

(22) Filed: May 3, 2013

(65) Prior Publication Data

US 2013/0340228 A1 Dec. 26, 2013

Related U.S. Application Data

(63) Continuation of application No. 11/285,015, filed on Nov. 23, 2005, now abandoned, which is a continuation-in-part of application No. 10/372,237, filed on Feb. 25, 2003, now Pat. No. 7,191,555.

(51) Int. Cl.

| | |
|---|---|
| ***B23P 11/02*** | (2006.01) |
| ***G09F 15/00*** | (2006.01) |
| *G09F 17/00* | (2006.01) |

(52) U.S. Cl.
CPC ............ *G09F 15/0025* (2013.01); *G09F 17/00* (2013.01)
USPC ............................................... 29/450; 40/603

(58) Field of Classification Search
USPC ........ 29/450, 428, 446, 448, 419.1, 458, 460, 29/406; 40/603, 610, 604, 611.01, 605, 40/645; 38/102.91, 102.1; 160/368.1, 329, 160/354
See application file for complete search history.

(56) References Cited

U.S. PATENT DOCUMENTS 7,191,555 B2 * 3/2007 Hughes ............................ 40/603

* cited by examiner

*Primary Examiner* — John C Hong
(74) *Attorney, Agent, or Firm* — Matthew A. Pequignot; Pequignot + Myers LLC

(57) ABSTRACT

Fabric display panels mountable on a frame for displaying graphical images and methods of making same. In some embodiments, fabric display panels which can be mounted on foldable frames to provide portable display systems.

12 Claims, 15 Drawing Sheets

FABRIC DISPLAY PANELS AND METHODS OF MAKING SAME

RELATED APPLICATION DATA

This application is a continuation of U.S. patent application Ser. No. 11/285,015, filed on Nov. 23, 2005, which itself is a continuation-in-part of U.S. patent application Ser. No. 10/372,237, filed Feb. 25, 2003, entitled DISPLAY PANELS. All claims of priority to these applications are hereby made, and the entireties of such applications are each hereby incorporated by reference. The entireties of U.S. patent application Ser. No. 11/947,701, filed on Nov. 29, 2007, U.S. Patent Application No. 60/867,792, filed on Nov. 29, 2006, and U.S. Patent Application No. 60/929,914, filed on Jul. 17, 2007, each entitled HUBS AND RECONFIGURABLE FRAMES, are also hereby incorporated by reference.

FIELD OF THE INVENTION

This invention relates to fabric display panels mountable on a frame for displaying graphical images and methods of making same. In some embodiments, this invention relates to fabric display panels which can be mounted on foldable frames to provide portable display systems.

BACKGROUND OF THE INVENTION

Stretch fabrics have been known and used for many years, such as for use in the theater industry such as for costumes and stage decorations. However, the advantages of stretch fabrics have not been fully realized for the sign and display industry. Indeed, it is believed that there is a long felt, unsatisfied need for display panels that are at least partially made of stretch fabric and that can be easily mounted to and dismounted from a supporting structure while simultaneously presenting a desirable and aesthetically pleasing appearance.

In view of the above enumerated drawbacks, it is apparent that there exists a need in the art for apparatus and/or methods which solve and/or ameliorate at least one of the above drawbacks. It is a purpose of this invention to fulfill those needs as well as other needs in the art which will become more apparent to the skilled artisan once given the following disclosure.

SUMMARY OF THE INVENTION

Generally speaking, this invention addresses the above-described needs in the art by providing:

a method of sizing a stretchable fabric panel prior to printing for use on a portable display frame, the method comprising:

selecting a fabric for printing a desired image thereon;

selecting a desired end-size of the fabric for producing a fabric panel, the size including, at least, a dimension x and a dimension y;

selecting a printing method for printing graphical images on the fabric;

determining a quantity of expected linear shrinkage in an x-axis of the fabric, designated LSX, which is expected to occur during a printing operation performed pursuant to the printing method;

determining a quantity of expected linear shrinkage in a y-axis of the fabric, designated LSY, which is expected to occur during a printing operation performed pursuant to the printing method;

sizing the fabric as a fabric panel for printing graphical images thereon having dimensions determined according to the formula:

a first linear dimension=$x$+LSX a second linear dimension=$y$+LSY.

In another embodiment, this invention provides:

a display apparatus comprising:

a frame having a plurality of display panel connectors; and a display panel comprising, at least in part, a layer of stretchable fabric, the display panel including a plurality of apertures for connecting to the plurality of display panel connectors, the plurality of apertures being located spaced apart from one another proximal a perimeter of the display panel, each of the plurality of apertures being so configured such that when the display panel is connected to the frame by affixing the plurality of apertures to the plurality of display panel connectors, the display panel exhibits curvilinear borders.

This invention will now be described with respect to certain embodiments thereof as illustrated in the following drawings wherein:

DETAILED DESCRIPTION OF CERTAIN EMBODIMENTS

Definitions

Figure 1:
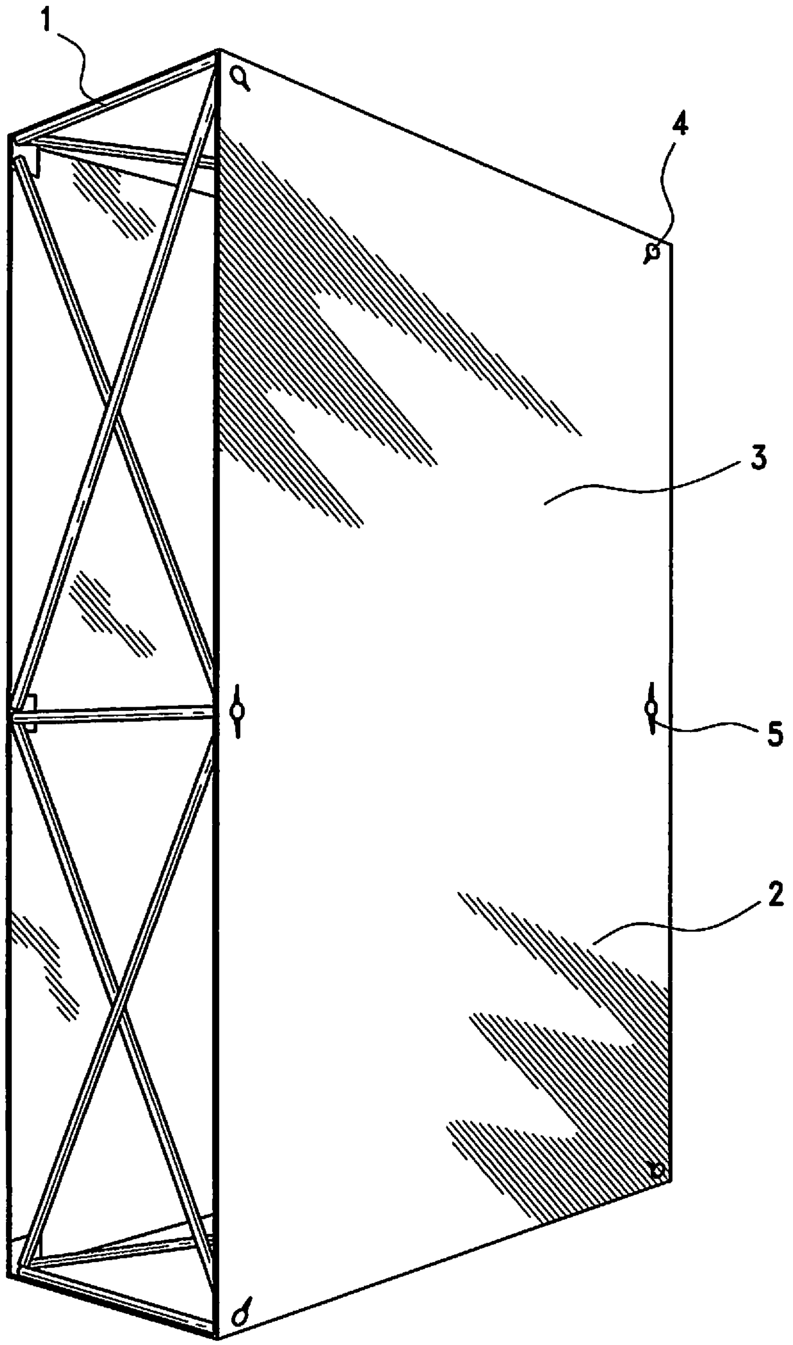
FIG. 1 is a perspective view of a support frame with stretch panels attached thereto.

"Polyester fiber" as used herein is a manufactured fiber in which the fiber forming substance is any long-chain synthetic polymer composed of at least 85% by weight of an ester of a substituted aromatic carboxylic acid, including, but not restricted to substituted terephthalic units and parasubstituted hydroxy-benzoate units.

"Display panels" as used herein refers to any type of structure having at least one surface that is useful for displaying purposes. The display panels can carry indicia, information, designs etc.

"Stretch fabric" as used herein refers to any type of fabric that extends when placed under tension, at least in parts, beyond the limits it assumes when it is not placed under tension. The stretchable fabrics of the present invention have, to some extent and over some period time, elastic properties.

"Base portion" as used herein in connection with display panels refers to a portion that extends across a display panel and which may or may not carry secondary structures, such as appliqués.

"Body" as used herein in connection with display panels refers to a structure that bears stretch loads within a display panel from a first mounting structure to a second mounting structure and that may extend across part or all of the space between the first and second mounting structures.

"Hem" as used herein refers to borders and edges.

"Part of a hem" as used herein refers to being integral or connected to the hem.

"Hook and loop fastener" as used herein refers to any fastener that uses hooks and loops for fastening purposes. Accordingly, a hook of a hook and loop fastener can be, e.g., a simple metal or plastic hook, or a hook portion of a hook and loop fabric fastener, such as that sold under the trademark VELCRO.

"Dye sublimation" as used herein refers to a printing process or image type which has unique mechanical or physical qualities as compared to other processes or images. Specifically, solid dye particles are changed into gas using heat and pressure, and then physically bonded to the polymers present (e.g., polymers of a stretch fabric material). Thereafter, the dye particles are changed back into a solid. In at least some versions of dye sublimation, the dye is changed directly from the solid to the gaseous state without becoming liquid. In certain useful dye sublimation techniques, dye binds to the physical structure of the stretch fabric, in the form of graphics and/or an image or images, such that it becomes part of the fabric chemically and/or mechanically (e.g., it has been reformed into the fabric and/or polymers, and it may, in some cases, appear to be underneath or part of the fabric surface or simply integral with the fabric). For example, the heat used in dye sublimation may, in some cases, open the pores of the polyester fabric and allows the dye vapor to enter. When the temperature is reduced, the pores close and the gas reverts to a solid state trapping the dye within the fiber of the fabric. In some embodiments, the dye, in the form of graphics, text, or images, has now become a permanent part of the fabric.

For a more complete understanding of the present invention and advantages thereof, reference is now made to the following description of various illustrative and non-limiting embodiments thereof, taken in conjunction with the accompanying drawings submitted herewith.

The present invention is directed to display panels that are adapted to be mounted on supporting structures.

At least portions of the display panels of the present invention are made of stretch fabric. In a preferred embodiment, this stretch fabric is a single layer fabric and in some embodiments, the stretch fabric is a single thickness fabric. In some embodiments, only the body of the panel will be stretch fabric, other portions of the panel are made of any type of material that is suitable for the purpose of the display, such as, but not limited to, fabrics such as natural fiber fabrics; e.g. cotton; synthetic fabrics, e.g., polyester based non-stretch fabrics, acetate/rayon mix fabrics, nylon fabrics; semisynthetic fabrics; fabrics with a metallic component; fiberglass based fabrics; cellulose/fiberglass mix materials; cellulose based materials; or plastic materials such as PVC or combinations thereof. In some embodiments, the base portion of the display panel is made of stretch fabric. In some embodiments, the entire display panel is made of stretch fabric.

The stretch fabric of the present invention is in many embodiments made of polyester fiber that comprises about 90 to about 100% polyester. Some of these fabrics contain up to about 10% Lycra. In some embodiments, the fabric is single layer stretch fabric. In some embodiments, the fabric is a single thickness of fabric. Fabric such a brocade are considered to be a single thickness of fabric. In some of the embodiments, the fabric is flame resistant or, more preferably, permanently flame resistant. In some embodiments, the fabric is a two-way stretch fabric, with a stretch of, for example, 10%×10%, 20%×20%, 30%×30%, 40%×40% or 50%×50%. In some embodiments, the fabric is a multiple ways stretch fabric. In some embodiments, the fabric has a flat weave with only slight stretch. While many of the stretch fabrics of the present invention are classified as "middle weight" and "heavy weight" fabrics, they are very lightweight compared to other materials that display panels are often made of, such as cardboard paper and plastic sheet materials. Some of the fabrics weigh less than 10 ounces per square yard, more preferably less than 6 ounces per square yard or less than 5 ounces per square yard. Stretch fabrics that have been found to be advantageous are marketed under the trademarks ACROBAT, TRAPESE, CELTIC CLOTH and POWER NET 100. However, other polyester stretch fabrics are within the scope of the present invention. Stretch fabrics that do not contain any polyester or minor amounts of polyester are also within the scope of the present invention. In many embodiments, the stretch fabric has been subjected to printing. In some embodiments, matter has been printed onto the stretch fabric via digital printing, for example via printing on VUTEX, NUR, SALSA and SCITEX digital print systems. In some embodiments, matter has been printed onto the fabric by silk screening. In certain embodiments, matter has been printed onto the fabric by ink jet printing. In a preferred embodiment, matter has been printed "onto" the stretch fabric via dye sublimation. Reference is made to the explanation of dye sublimation provided hereinabove, which explains how dye sublimation, in some embodiments, integrates dye into or within the fabric itself to produce an image (e.g., text and/or graphics) which has a proper or acceptable "resolution" even when stretched (e.g., because the dye sublimated image has become mechanically and/or chemically bonded to polymers or other portions of the fabric, such that it becomes part of the fabric structure). However, any suitable method to apply printed material onto the stretch fabric is within the scope of the invention.

The display panels of the present invention are adapted to be mounted on supporting structures. A wide variety of supporting structures are contemplated. Essentially any supporting structure to which the display panel described herein can be mounted, either with or without prior modification of the support structure or with or without the use of mounting accessories, such as mounting bars, is within the scope of the present invention. In a preferred embodiment, such supporting structures are foldable frames. In a more preferred embodiment, such foldable frames are lightweight. In another preferred embodiment, such frames can be brought into a compact state within a very short time. In another preferred embodiment, the supporting structure has integral hubs onto which the display panels can be mounted via e.g. buttonholes or loop structures. Suitable foldable frames are described in U.S. Pat. Nos. 4,986,016 and 5,125,205. When a display panel according of the present invention is mounted onto a fully set up supporting structure, the stretch fabric of the display panel is, in most embodiments, under stretch tension.

Some preferred ways of mounting the display panels of the present invention onto such supporting structures will now be described with reference to the figures.

FIG. 1 shows a display panel 2 according to the present invention mounted onto a supporting structure 1. Material 3 is printed on the display panel. In some embodiments, a base portion of the display panel is made of stretch fabric and material is directly printed onto this base portion. In other embodiments structures, such as appliqués or pouches, are attached to the base portion of the display panel. In such embodiments, the base portion may or may not have printed material on it. In some embodiments, the body of the display panel is made of stretch fabric, while the remainder of the display panel is made of other materials. Some suitable materials that can be used in such a display panel have been described above. In some embodiments, at least parts of the stretch fabric are of single layer construction. As indicated above, when a display panel 2 is attached to a fully set up support structure, at least the body of the display panel is, in a preferred embodiment, under stretch tension. This, in combination with a preferred mounting of the panel, which will be described in more detail below, allows, in certain preferred embodiments, for a mostly ripple free appearance of those portions of the display panel that are made of stretch fabric. A panel mounted in the way shown in FIG. 1 will generally be wrinkle free after the display panel has been mounted for only a short period of time on a supporting structure even if the display panel was folded into different directions prior to mounting.

The periphery of the display panels are, in certain, but not all, preferred embodiments, made of stretch fabric. In this and other embodiment, the edges of the display panel may have a hem that is made by turning and sewing the borders of at least parts of the panel. However, as the person skilled in the art will appreciate, any other suitable hem is within the scope of the invention.

The display panel according to a present invention can be mounted onto a supporting structure in many different ways.

Figure 2A:
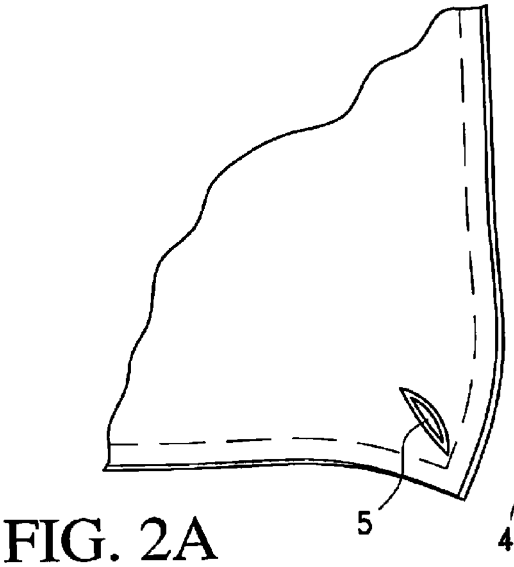
FIG. 2*a* shows a display panel with a corner buttonhole that is adapted to be attached to a hub of a supporting structure.
Figure 2B:
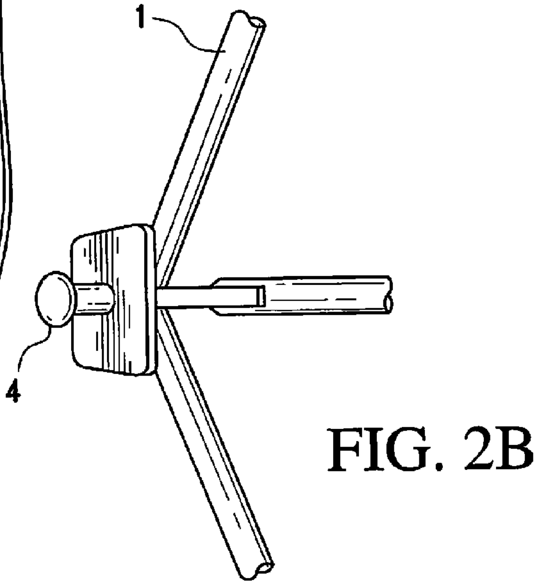
FIG. 2*b* shows such a hub.
Figure 3A:
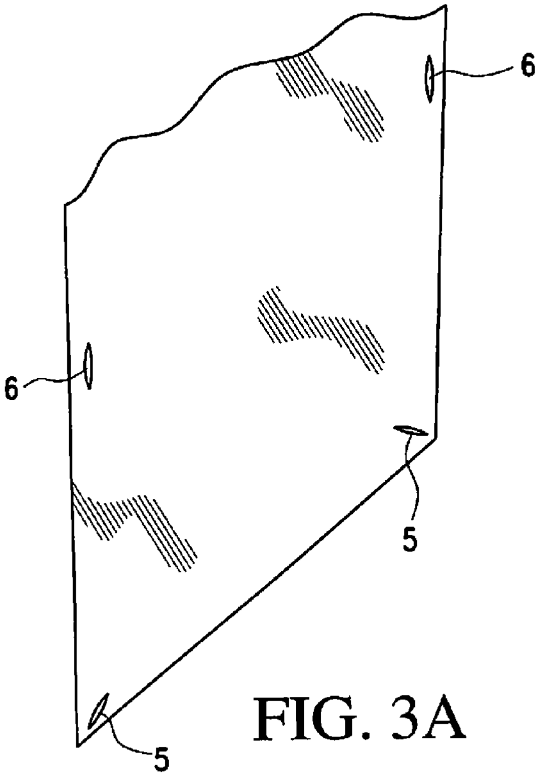
FIG. 3*a* is a perspective view and FIG. 3*b* is a top view of a display panel that have buttonholes aligned in different ways.
Figure 3B:
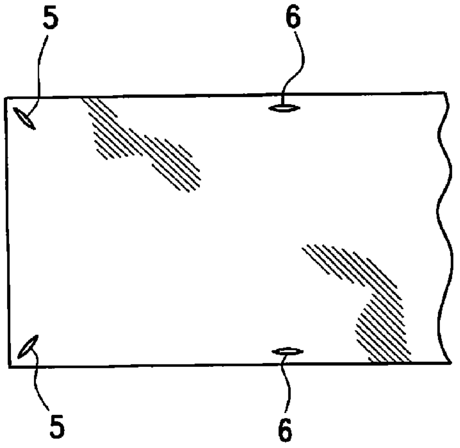

In one preferred embodiment, the display panel has apertures that can be fastened to protrusions that are part of the supporting structure such as the hubs 4 shown in FIGS. 1 and 2*a, b*. While in some preferred embodiments, those protrusions are part of the supporting structure, in other preferred embodiments, suitable protrusions can be attached to the supporting structure. Any protrusion that allows fastening of the display panel via an aperture to the supporting structure is suitable. In one preferred embodiment, the apertures in the display panel are buttonholes. In an even more preferred embodiment these buttonholes are elongated. In yet another preferred embodiment, the buttonholes have reinforcement at their edges. In the embodiment shown in FIGS. 2*a, b* and 3*a, b*, the display panels have corners of roughly 90 degrees and the longitudinal axis of the buttonholes 5 locates in such corners divide these corners into roughly equal parts. However, the corners of the present invention can have many different angles, may or may not be pointed and may or may not be defined by substantially straight sides. For example, rounded corners and corners defined by undulating or rounded sides are within the scope of the claimed invention. Equally, the alignment of the buttonholes can take many different directions. In embodiments in which there are at least two pairs of diagonally opposed elongated buttonholes, one can imagine a first axis defined by an imaginary reference line passing through a first of said pairs and a central portion of a display panel and a second axis defined by a second imaginary reference line passing through the second of said pairs of buttonholes and a central portion of the display panel. In such embodiments, the first and second buttonhole pairs may take any direction in which they are elongated more nearly parallel then perpendicular to said first and second axes. In a preferred embodiment, these first and second buttonhole pairs are substantially parallel to said first and second axes. Buttonholes with this orientation are designated 5 in FIGS. 2*a, b* and 3*a, b*. As depicted in FIG. 3*a* and FIG. 3*b*, additional buttonholes 6 many have different orientation. Those additional buttonholes are more nearly parallel than perpendicular to an imaginary reference line extending along a side of the display panel. In many embodiments, and as shown in FIGS. 2*a, b* and 3*a, b*, the buttonholes are at the edge of the display panel. However, the buttonholes can be at any other suitable position. At least some of the buttonholes are, in certain embodiments, in single layer portions of the stretch fabric. In certain embodiments, for example, the particular angular orientations of the buttonholes and/or combinations of angular orientations of buttonholes for certain configurations and/or dimensions of the display panel aid in and/or effect the achievement of a wrinkle-free, or a substantially wrinkle-free appearance of the display panel.

Figure 4A:
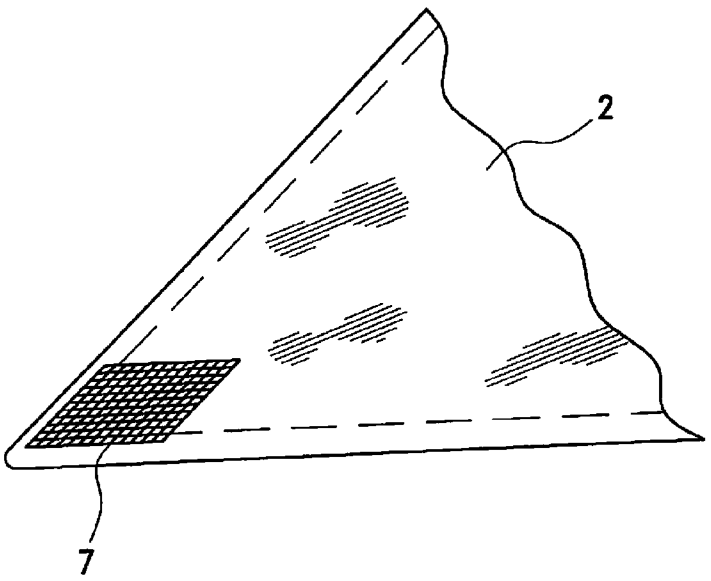
FIGS. 4*a* and 4*b* are back and front views, respectively, of parts of a display panel having a VELCRO mounting attachment.
Figure 4B:
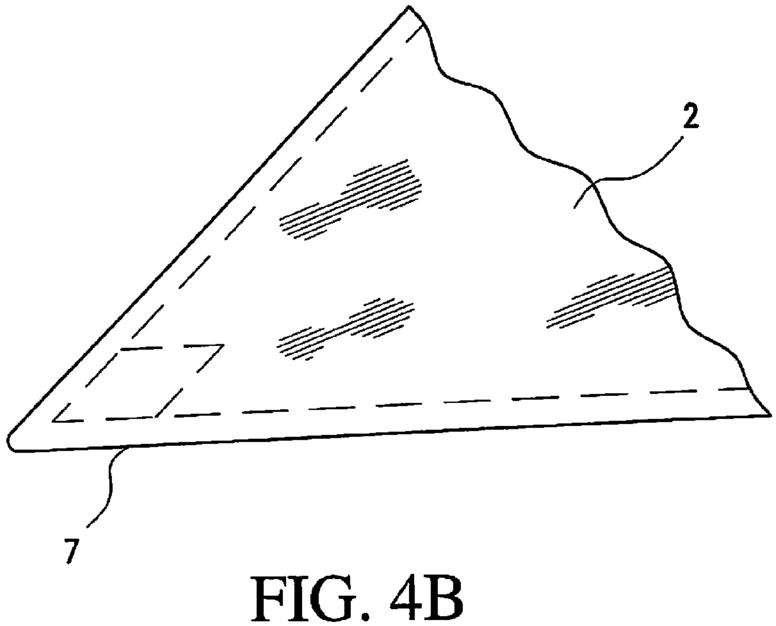

Another embodiment includes fastening the display panels to a supporting structure via one or more VELCRO fasteners. FIGS. 4*a* and 4*b* shows how, for example, one part of a VELCRO fastener 7 can be attached to a display panel. In the embodiment shown, the display panel would be attached via a complimentary part of the VELCRO fastener which is attached or part of the supporting structure. Many modifications of the arrangement shown are within the scope of the present invention. The VELCRO fastener can take different shapes and positions. For example, the VELCRO fastener can be attached to the display panel along an edge of the panel and, if desirable, the center as well as any portion of the panel between the center and the edges. Also, the complimentary part of the VELCRO fastener can be attached to the display panel itself. In such an embodiment, fastening can be achieved, e.g., by wrapping parts of the panel around the supporting structure and securing the complimentary parts of the VELCRO fastener to each other.

Figure 5A:
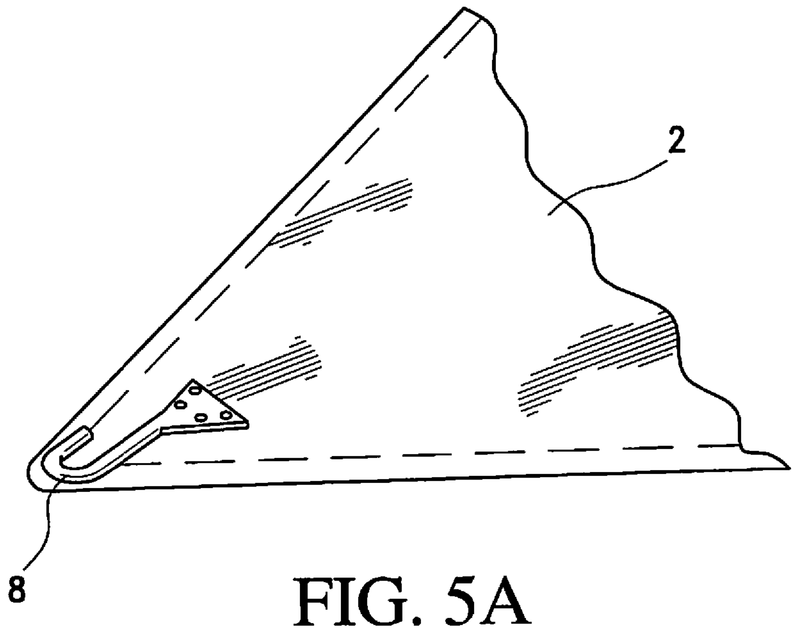
FIGS. 5*a* and 5*b* are back and front views, respectively, of parts of a display panel having a hook mounting attachment.
Figure 5B:
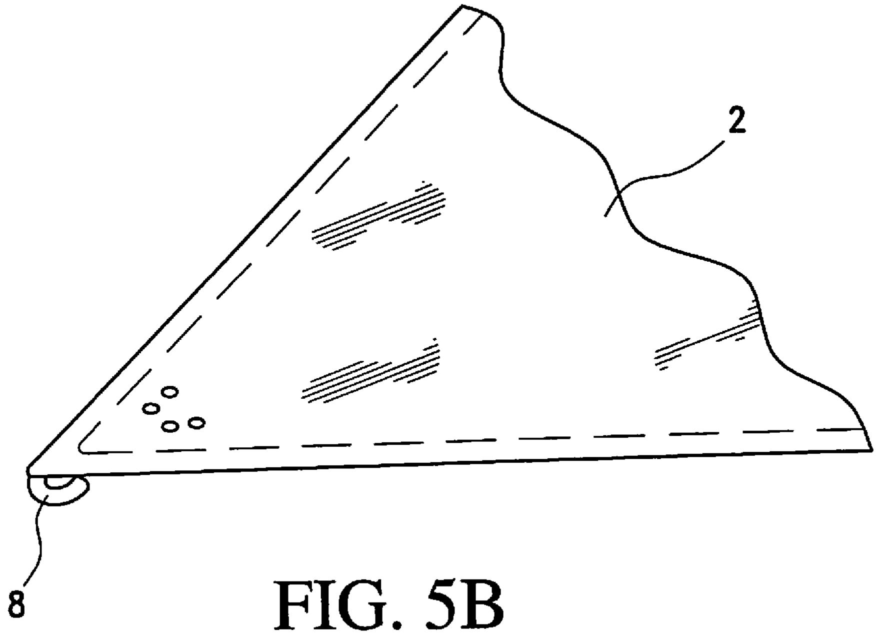
Figure 6A:
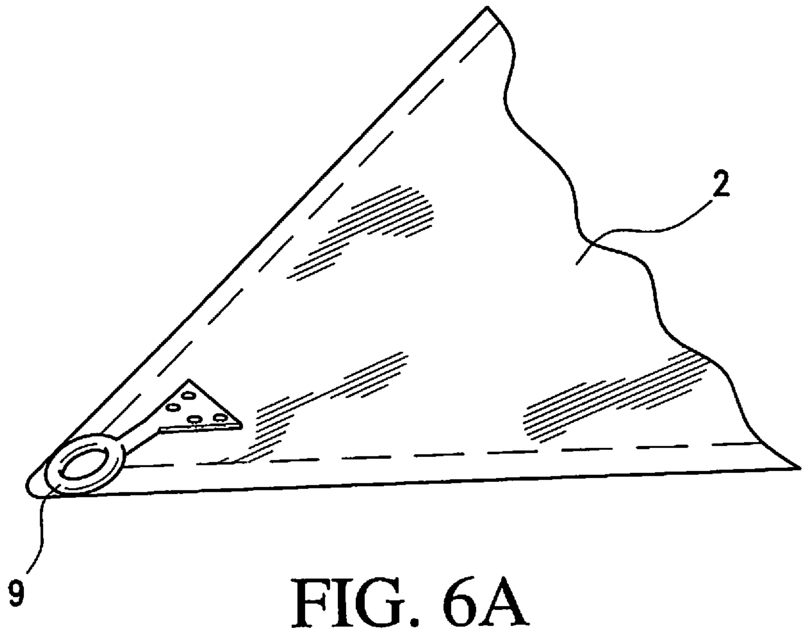
FIGS. 6*a* and 6*b* are back and front views, respectively, of parts of a display panel with a loop mounting attachment.
Figure 6B:
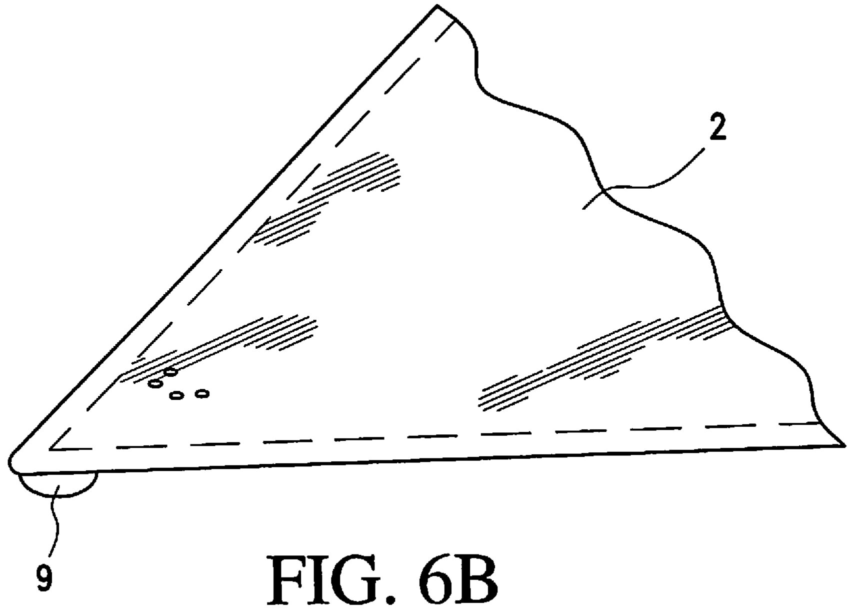

Another contemplated embodiment of the present invention includes fastening the display panels to a supporting structure via hook(s) and/or loop(s) that are attached to the display panel. FIGS. 5*a* and 5*b* shows how a hook 8 can be attached to a display panel and FIGS. 6*a* and 6*b* shows how a loop 9 can be attached to a display panel. In these embodiments, the display panel can be attached to any part of the supporting structure to which a hook or loop, respectively, can be fastened. Alternatively, loop(s) and hook(s) complimentary to the hook(s) and/or loop(s) of the display panel can be attached to or be part of the supporting structure. In one embodiment, a display panel includes both hooks and loops. Many modifications of the configurations shown in FIGS. 5*a, b* and 6*a, b* are contemplated. The hooks and loops can take any form and size that allows attachment to a respective supporting structure. The hooks and loops can be made of any suitable material, e.g. plastic, metal or fabric. The hooks and loops can also be attached to the display panel at different places including the edges of the panel and, if desirable, the center as well as any portion of the panel between the center and the edges. The hooks and loops can take any form and size that allows attachment to a respective supporting structure. The supporting structure may or may not have complementary loops and hooks.

Figure 7A:
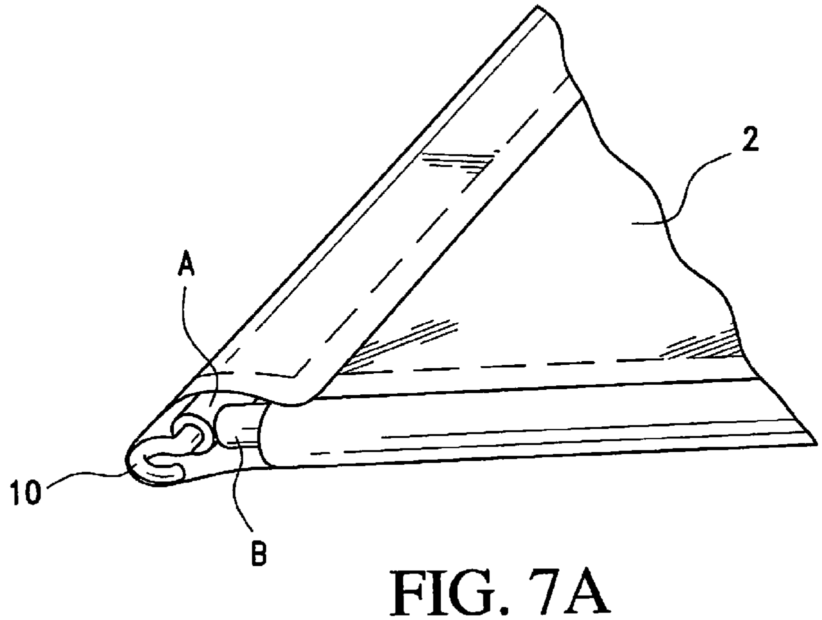
FIGS. 7*a* and 7*b* show parts of a display panel with a mounting attachment in form of a hook attached to a rod integrated into the hem of the panel, an additional or integral rod is also shown.
Figure 7B:
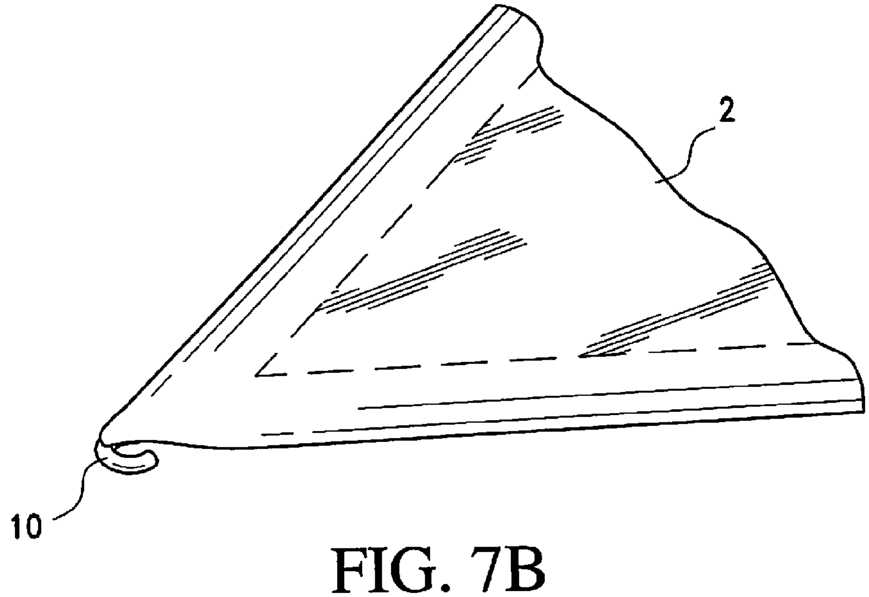
Figure 8A:
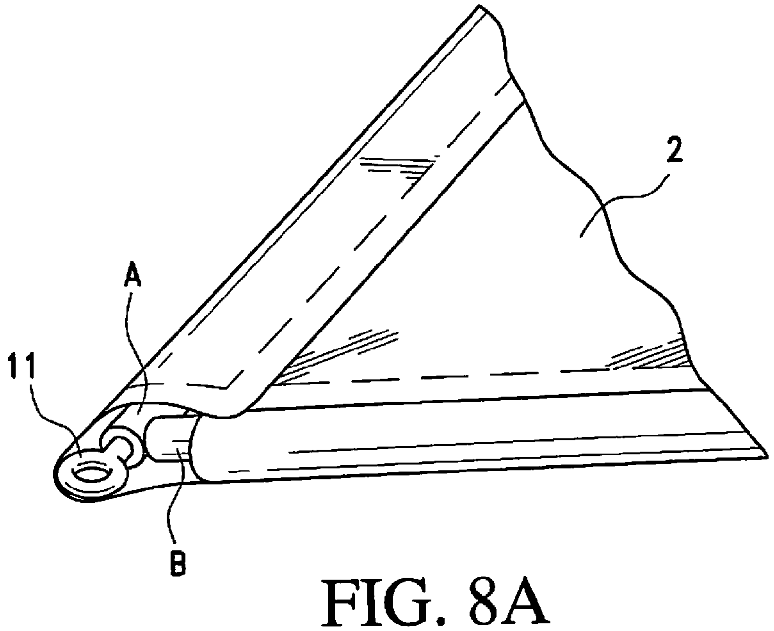
FIGS. 8*a* and 8*b* show parts of a display panel with a mounting attachment in form of a loop attached to a rod.
Figure 8B:
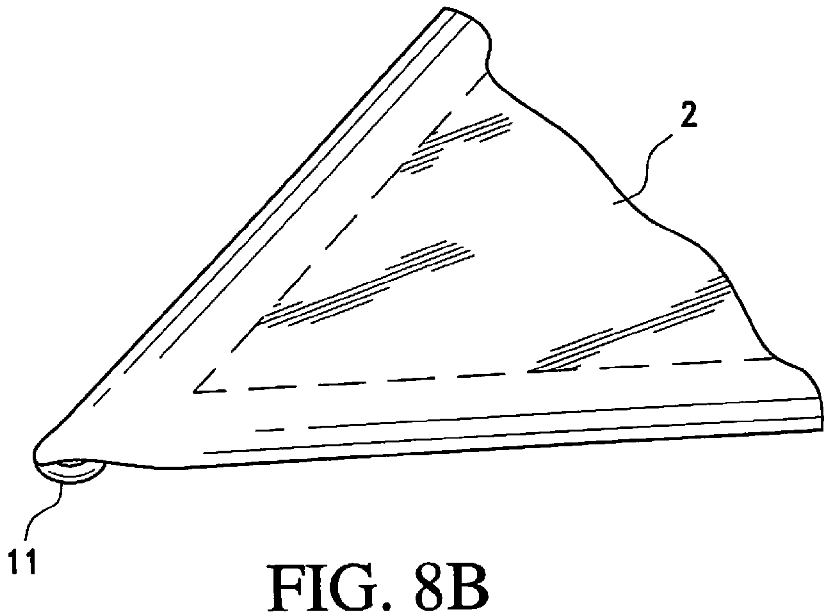

Another contemplated embodiment includes fastening the display panels to a supporting structure via mounting structures such as hook(s) and loop(s) that is/are attached to one or more mounting supports such as a rod. FIGS. 7*a* and 7*b* shows a mounting structure in form of a hook 10 attached to a mounting support, e.g., a rod A, that is sewn into a hem of the display panel 2. FIGS. 7*a* and 7*b* show a rod B that is sewn into the hem and is attached to rod A. In some embodiments, rod B or a similar mounting support, will be a integral part of rod A. FIGS. 8*a* and 8*b* shows a loop 11 attached to a mounting support, e.g., a rod, that is sewn into a hem of the display panel 2. The mounting supports can take different shapes, can be made from different materials and can be attached to the panel in any suitable way. While FIGS. 7*a, b* and 8*a, b* show hooks and loops as distinct entities of the mounting structure, integral hooks and loops or any other integral mounting structure such the mounting structures discussed above, as well as structures that are part of the mounting support and that fulfill mounting structure functions are within the scope of the present invention. Again many modifications of the configurations shown in FIGS. 7*a, b* and 8*a, b* are contemplated. The mounting support can be attached to a display panel at different places including the edges of a panel and, if desirable, a central portion of the display panel as well as any portion of the panel between the center and the edges. The mounting structures can be at any suitable place on the mounting support.

Figure 9A:
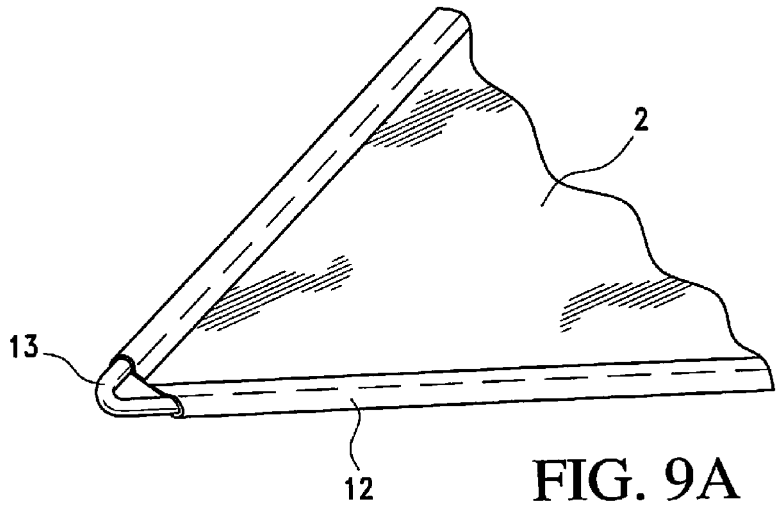
FIGS. 9*a*-9*d* show display panels with different elastic loop mounting attachments.
Figure 9B:
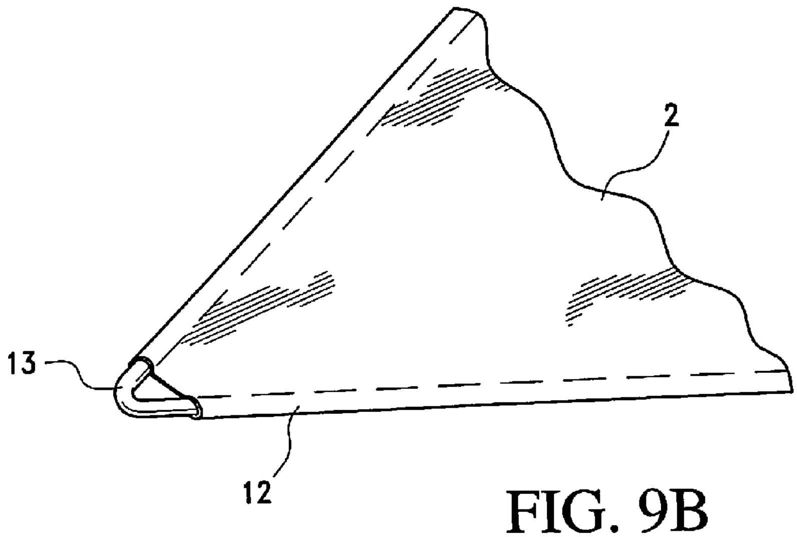
Figure 9C:
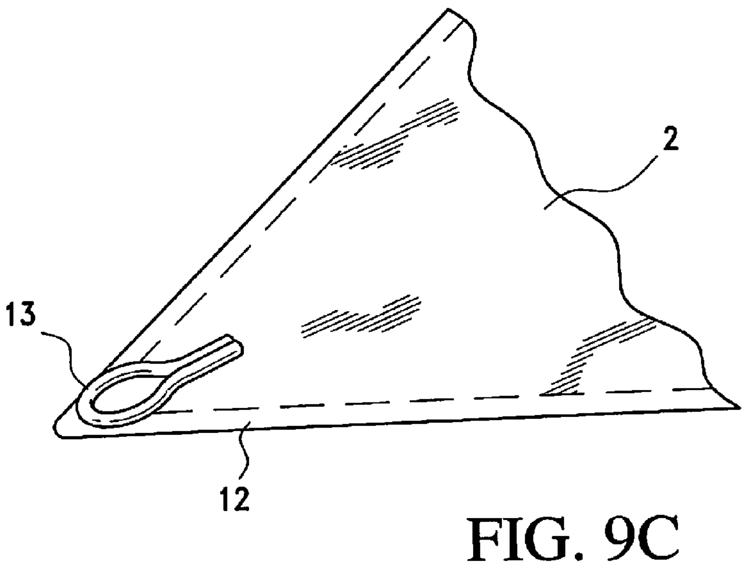
Figure 9D:
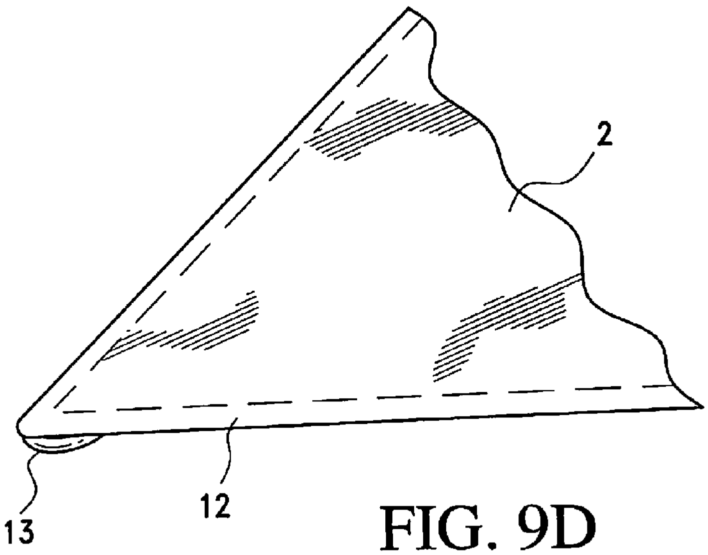

Another embodiment includes fastening the display panels to a supporting structure via elastic loop structures that are attached to the display panel. FIGS. 9*a* and 9*b* show two of many different ways in which an elastic loop 13 can be attached to an display panel. FIG. 9*a* shows an elastic loop that forms an integral part of the hem of the display panel. FIG. 9*b* shows an elastic loop that is attached to a corner of the display panel. In a preferred embodiment, the elastic loop(s) are/is attached to the hem of the display panel. In another preferred embodiment, the elastic loop(s) are/is an integral part of the hem of the display panel. Additional elastic loops can be attached at any other part of the display panel. The loop(s) only have to have minimal elasticity and are not restricted to any particular material.

Figure 10:
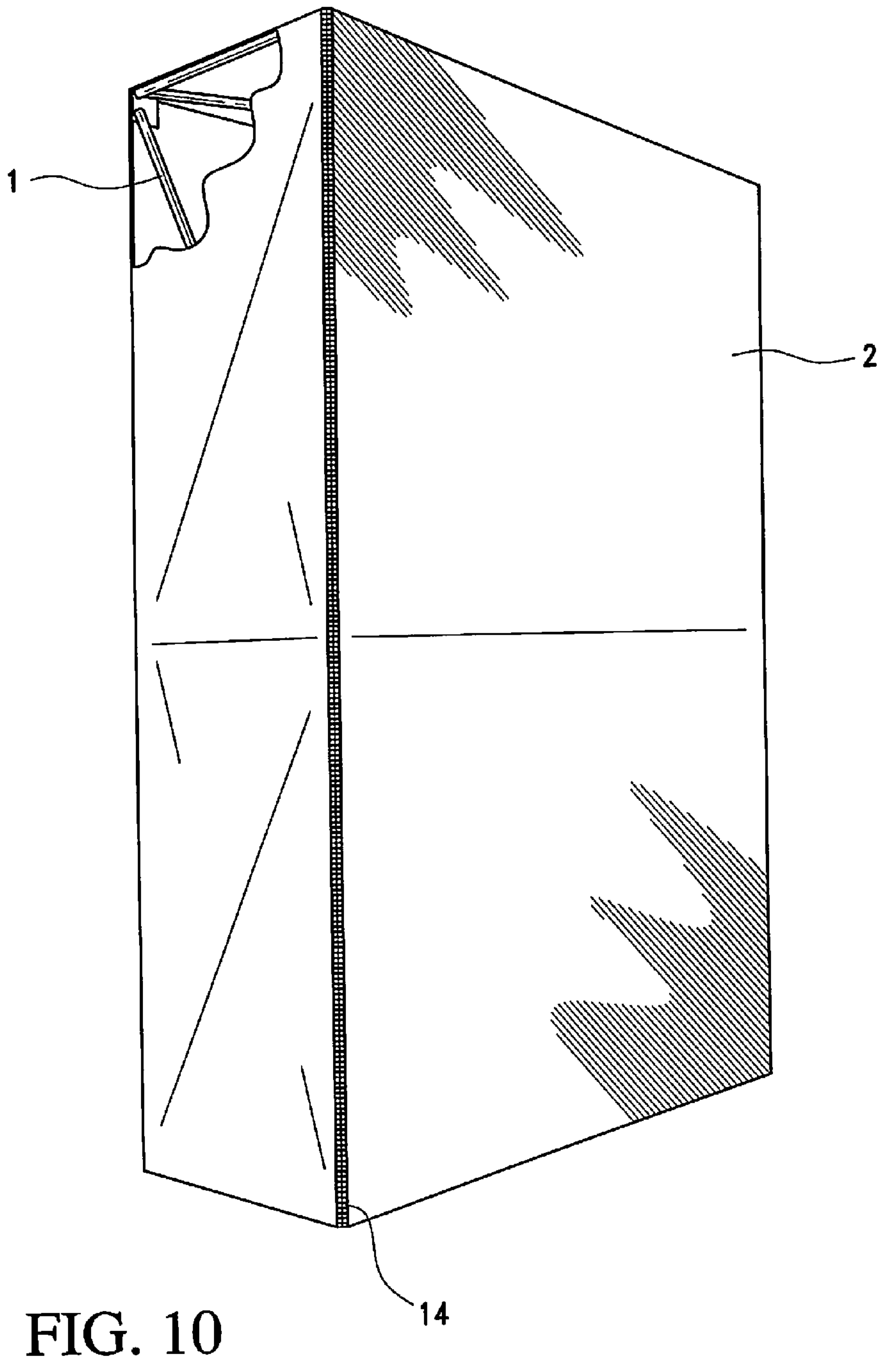
FIG. 10 shows part of a display panel which is mounted over a supporting structure. The display panel is mounted on the supporting structure via a zipper arrangement.

Another embodiment includes fastening the display panels to a supporting structure via a zipper. FIG. 10 shows a display panel that envelops a supporting structure whereby envelopment of the supporting structure I is achieved via a zipper 14 that connects edges of the display panel. While FIG. 10 shows a configuration in which the entire supporting structure is enveloped, partial enveloping of a supporting structure is within the scope of the present invention. One or more zippers are contemplated. The zippers can be aligned with the support structure as shown in the drawings, but can, depending on the shape of the display panel(s) be aligned in any other suitable way. In connection with this zipper configuration, a singular display panel can be zipped up around the supporting structure or multiple display panels can be zipped together. Also, one or more display panel attached to one or more other panels, such as stretch r non-stretch cloth panels, via one or more zippers.

Figure 11:
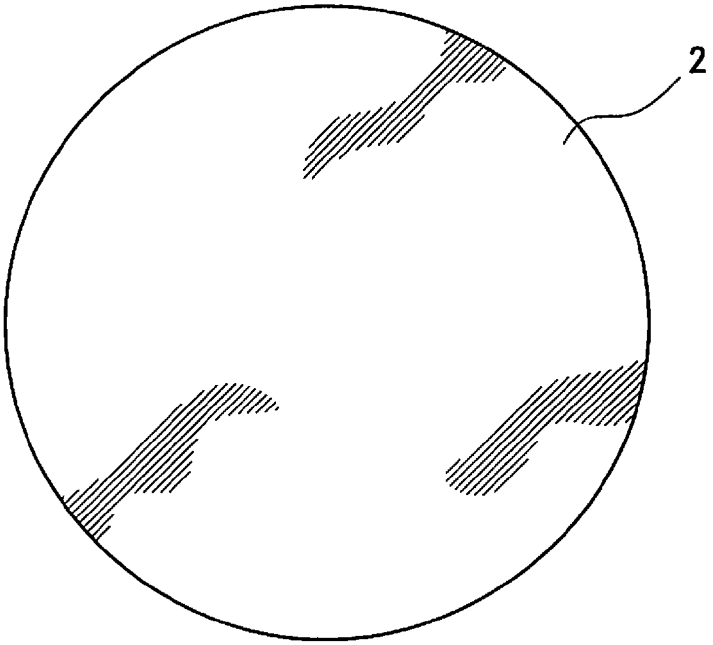
FIG. 11 shows a round display panel.
Figure 12:
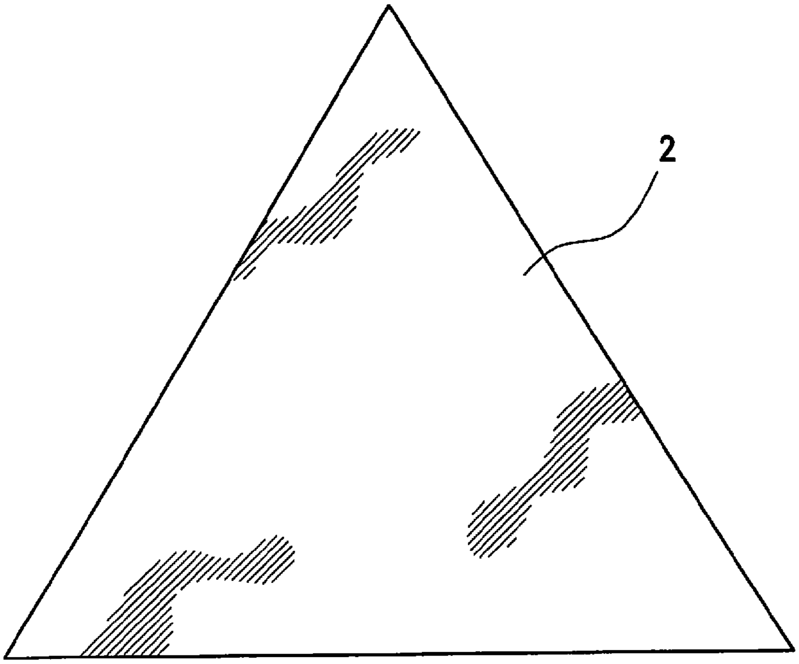
FIG. 12 shows a triangular display panel.

FIGS. 11 and 12 show some representative configurations of the display panel according to the present invention. FIG. 11 shows a round panel and FIG. 12 shows a triangular panel. However, any desirable configuration of the display panel is within the scope of the invention.

Figure 13:
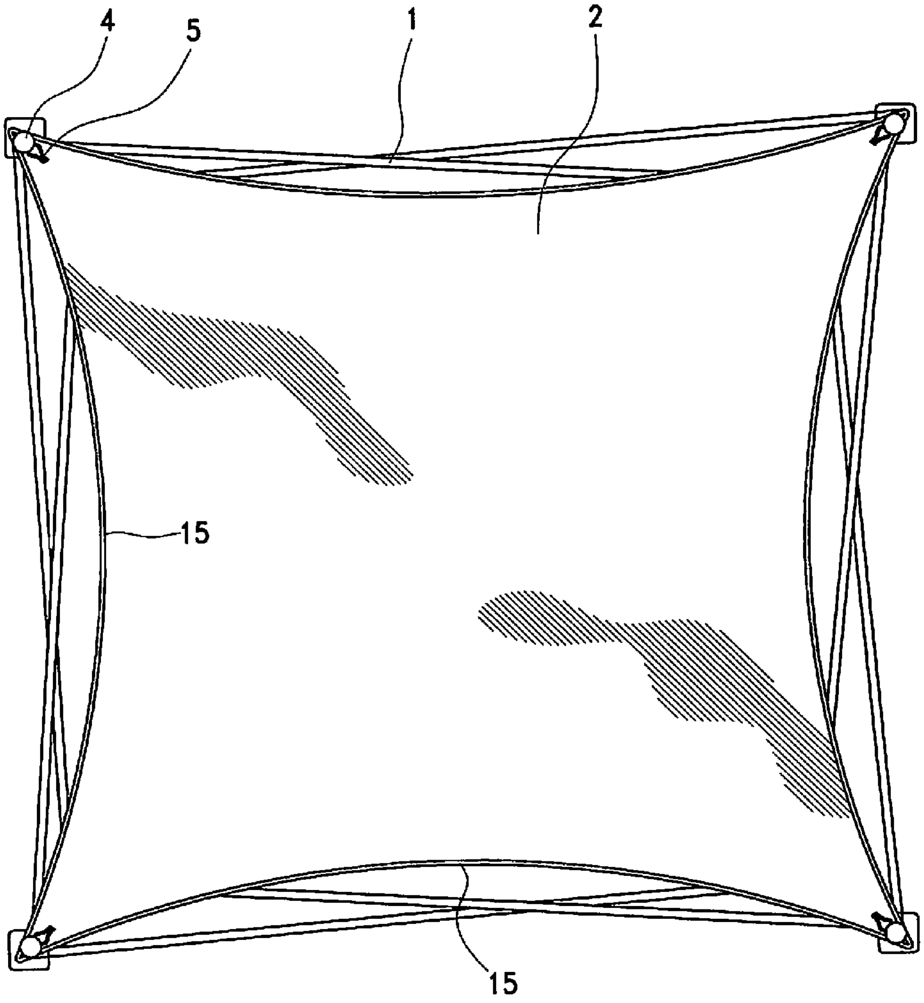
FIG. 13 illustrates a fabric display panel having curvilinear edges according to one embodiment of the subject invention.
Figure 14A:
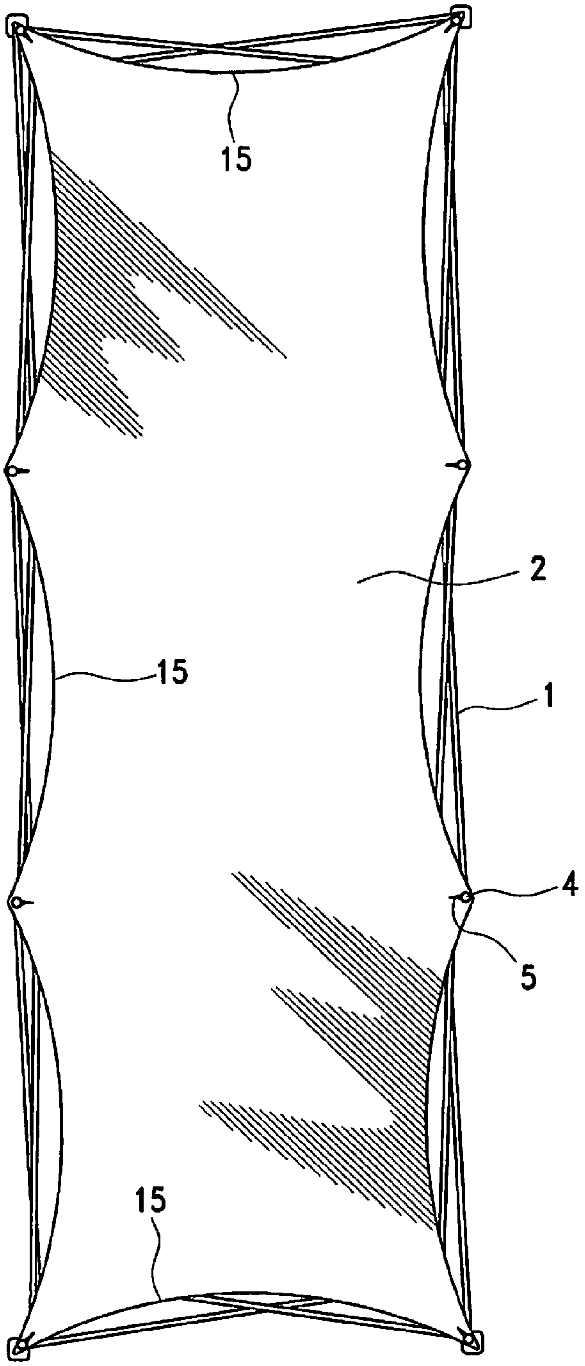
FIGS. 14*a* and 14*b* illustrate alternative embodiments of fabric display panels having curvilinear edges.
Figure 14B:
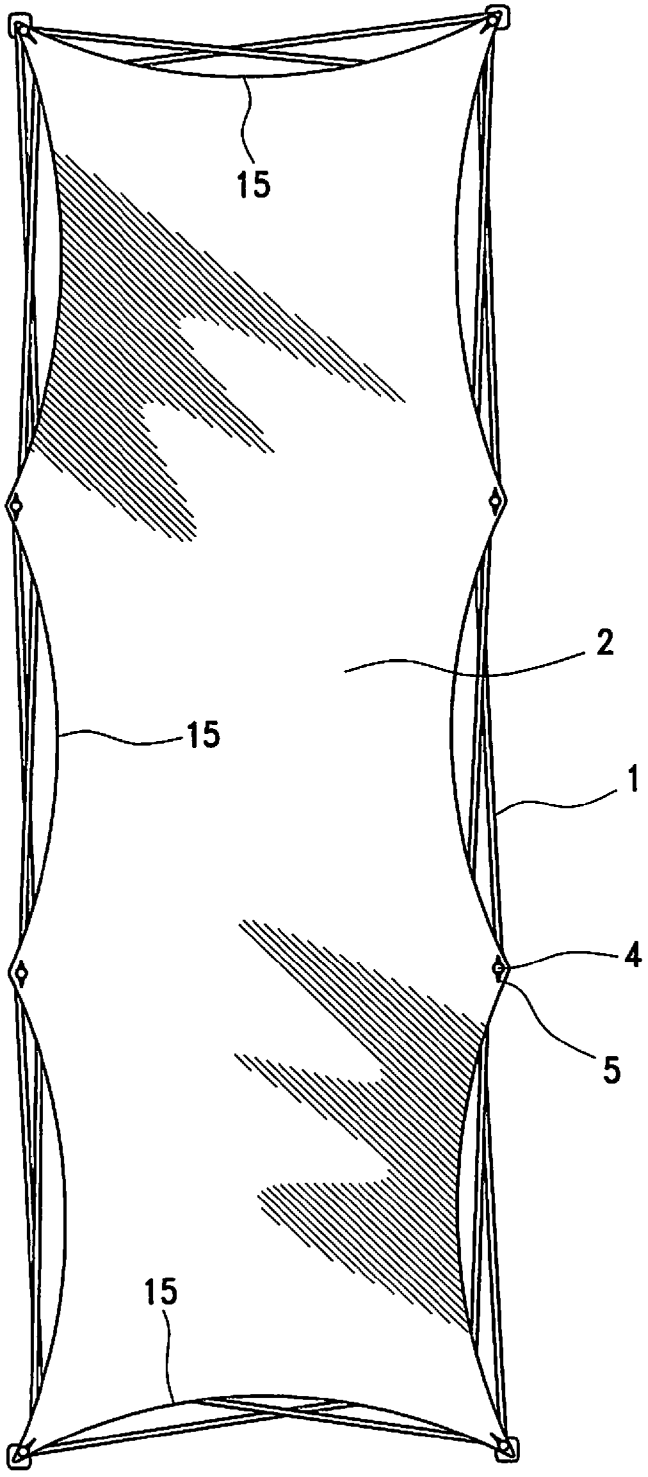
Figure 15:
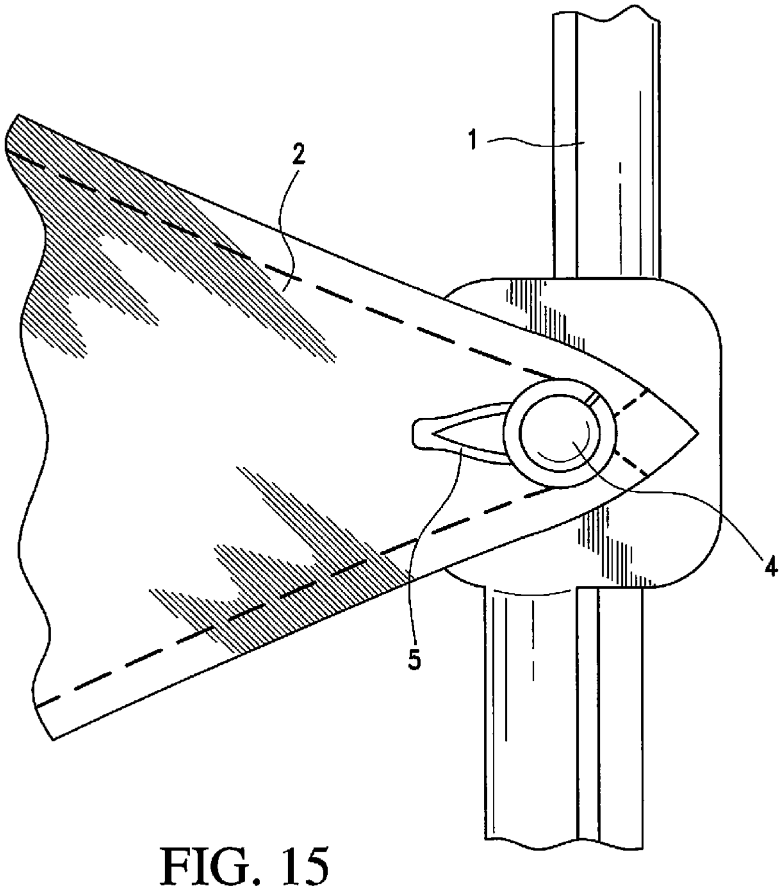
FIG. 15 illustrates a detailed view of an aperture of the fabric display panel depicted in FIG. 13.

Turning now to FIGS. 13-15, an alternative embodiment of display panel 2 is illustrated therein (shown assembled on frame or support structure 1). In the illustrated embodiment, display panel 2 exhibits curvilinear edges or borders 15. In particular, the formation of such curved borders, alone, or in combination with methods of manufacture described below, aid in ensuring that graphics printed on the display panel are generally, or, in some cases, substantially completely undistorted when the display panel is stretched over and connected to support structure 1. Moreover, the formation of the curved sides or borders 15 results in a substantially wrinkle free (or completely wrinkle free) display panel when installed on a frame. Substantially wrinkle free, in this context, refers, in particular, to a condition in which the display panel is smooth or unwrinkled at least throughout the central portion of the display panel where graphics or text is normally printed i.e. to an extent such that the appearance of the printed text or graphics is generally undistorted in appearance. Nevertheless, in some applications, an entirely wrinkle free display panel is preferred.

In at least one embodiment, in order to obtain the curvilinear borders 15 such as shown in FIGS. 13 and 14*a-b*, apertures 5 (e.g. buttonholes) are specifically configured and oriented to achieve a particular appearance. For example, in an embodiment of a display panel having four corners (and hence four apertures) as illustrated in FIG. 13, each aperture 5 is an elongated eyelet-type structure (having an imaginary axis extending longitudinally therethrough) which is oriented at an angle of approximately 45 degrees relative to the sides or border edges of panel 2. It is noted, of course, that due to the curvilinear nature of the sides or borders, measuring a specific angle is a somewhat difficult task. Thus, for the purposes of interpreting the disclosure herein, angles should be measured as if the sides are linear and oriented horizontally and vertically, respectively. Nevertheless, it is contemplated that a variety of angles are capable of producing the desired end panel configurations, such useful angles being generally selected from between 30-60 degrees (i.e. measured from a horizontal or vertical side).

In another embodiment of display panel 2 which utilizes more than four apertures such as depicted in FIGS. 14*a-b* (eight are shown in the figure), the orientations of the non-corner apertures are angularly different than the orientations of the apertures located at the panel corners. For example, in the embodiment shown in FIG. 14*a*, non-corner apertures 5 are oriented generally perpendicularly to their respective vertical panel sides. In other embodiments, such as illustrated in FIGS. 1 and 14*b*, however, non-corner apertures 5 are oriented angularly parallel to the vertical sides of the panel. In either event, a specific combination (or combinations) of aperture orientations can be selected depending on the end appearance desired for the particular display application.

During certain printing processes for producing graphical images on the display panel, such as dye sublimation, certain factors in the process, such as heat, cause shrinking of the fabric display panel. Thus, if such shrinking is not accounted for, the panel, when mounted on a support structure 1 will display an image which is distorted in appearance. Therefore, certain methods of display panel manufacture have been devised which solve the aforementioned image distortion problems.

In one such method, once the desired end size of a fabric panel is selected (for mounting on a display frame), adjustments are made to the dimensions of the starting fabric material in order to account for the shrinkage which has been determined to occur during certain image printing methods, such as during dye sublimation, for example. It is noted, in this regard, that the shrinkage which occurs is not simply limited in effect to the end size of the fabric panel, but, additionally, acts to distort the image which is printed thereon when the panel is mounted on a support structure 1.

For example, in a dye sublimation printing process, when printing an image on a generally square or rectangular fabric panel, it has been discovered that a shrinkage occurs in both the x and y axis of the panel (i.e. in the horizontal and vertical dimensions of the fabric). In this regard, in such a printing process, it has been discovered that approximately 3-4.5 inches of shrinkage occurs in the x-axis of the panel (i.e. the width) designated as linear shrinkage-x (LSX), and approximately 2-3 inches of shrinkage occurs in the y-axis of the panel (i.e. the height) designated as linear shrinkage-y (LSY). This shrinkage, in turn, if not accounted for, causes a corresponding distortion in the appearance of the finished display panel. Therefore, in order to adjust for such shrinkage, the starting panel material is increased in size in dimensions corresponding to the determined dimensions of shrinkage. Thus, the following formula can be employed when selecting the starting dimensions of a fabric panel which will be subjected to a dye sublimation:

$$\text{Width}=x+\text{LSX}$$

$$\text{Height}=y+\text{LSY}$$

When employing such a formula in fabric display panel production, the desired end appearance and dimensions of a fabric display panel are consistently achievable thereby dramatically improving the efficiency of the display panel production process.

It is noted, of course, the different fabric materials, as well as differently dimensioned fabric panels, will likely experience different rates of shrinkage during dye sublimation. Moreover, if alternatives to dye sublimation are employed, shrinkage rates may differ as a result of the differences in the printing processes. Therefore, it is contemplated that certain experimentation must be undertaken when alternative printing methods are used, new fabric materials are employed, or new panel sizes are printed. Nevertheless, once dimensions LSX and LSY are determined (e.g. as averages calculated according to the results of batch experiments), such dimensions can be employed in the formula above to reliably produce fabric panels which will be acceptable in both appearance and size for end use (e.g. within certain tolerances) such as at trade shows, for example.

Once given the above disclosure, many other features, modifications, and improvements will become apparent to the skilled artisan. Such other features, modifications, and improvements are therefore considered to be part of this invention the scope of which is to be determined by the following claims:

I claim:

1. A method of producing and assembling a portable display apparatus, comprising:

a) providing a frame having a plurality of corners and having a plurality of spaced apart hubs with at least one hub located proximal at least at each of said corners, said frame being foldable into a compact state for transportation purposes; and providing a display panel connector on each of said hubs;

b) forming a size tailored, stretchable fabric panel having a plurality of corners, prior to an image forming operation, for assembly to said foldable frame, according a method comprising:

selecting a fabric for forming a desired image thereon;

selecting a desired end-size of said fabric for producing a fabric panel, said size including, at least, a dimension x and a dimension y;

selecting a dye sublimation image forming method for forming graphical images on said fabric;

determining a quantity of expected linear shrinkage in an x-axis of said fabric, designated LSX, which is expected to occur during a dye sublimation image forming operation performed pursuant to said dye sublimation image forming method;

determining a quantity of expected linear shrinkage in a y-axis of said fabric, designated LSY, which is expected to occur during said dye sublimation image forming operation performed pursuant to said dye sublimation image forming method;

forming said fabric into a fabric panel for forming graphical images thereon, said fabric panel formed to have dimensions determined according to the formula:

$$\text{a first linear dimension}=x+\text{LSX}$$

$$\text{a second linear dimension}=y+\text{LSY}$$

c) forming graphical images on said fabric panel utilizing said dye sublimation image forming method;

d) forming apertures proximal each of said plurality of corners of said fabric panel;

e) connecting each aperture of said fabric panel to a corresponding display panel connector located on said hubs of said frame; and wherein said fabric panel is connected to said foldable frame via said apertures such that when said frame is in an unfolded state, said fabric panel is stretched between said display panel connectors and is in stretch tension such that said fabric panel, including said graphical images formed thereon, appears substantially wrinkle free.

2. The method according to claim 1 further comprising: tailoring angular orientations of said apertures of said fabric panel to aid in obtaining a substantially wrinkle free appearance of said fabric panel when said fabric panel is mounted on said foldable frame.

3. The method according to claim 2, wherein each said aperture is tailored in configuration to be elongated and oriented at approximately a 45 degree angle.

4. The method according to claim 2, wherein said fabric panel is comprised entirely of stretch fabric.

5. The method according to claim 4, wherein said stretch fabric weighs less than about 10 ounces per square yard.

6. The method according to claim 4, wherein said fabric panel comprises a stretch polyester fabric comprising at least about 90 to about 100 weight percent polyester fiber.

7. The method according to claim 4, wherein said fabric panel comprises a stretch polyester fabric.

8. The method according to claim 2, wherein each aperture is elongated and wherein a longitudinal axis of each said elongated aperture, located proximal its said respective corner, divides each said respective corner into two substantially equal sections.

9. The method according to claim 2, wherein each said aperture is reinforced at its edges.

10. The method according to claim 2, wherein said fabric panel is generally square in shape.

11. The method according to claim 2, wherein said fabric panel is generally rectangular in shape.

12. The method according to claim 2, wherein said fabric panel is removably connected to said foldable frame via said display panel connectors.

* * * * *